(12) United States Patent
Casto et al.

(10) Patent No.: US 7,944,929 B2
(45) Date of Patent: *May 17, 2011

(54) SECURE INTEGRATED MOBILE INTERNET PROTOCOL TRANSIT CASE

(75) Inventors: Brian W. Casto, Copley, OH (US); Tom L. Smith, Silver Lake, OH (US); John J. Retterer, Marion, OH (US)

(73) Assignee: ICI Networks LLC, Akron, OH (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/341,480

(22) Filed: Dec. 22, 2008

(65) Prior Publication Data

US 2009/0175254 A1    Jul. 9, 2009

Related U.S. Application Data

(63) Continuation of application No. 10/804,493, filed on Mar. 18, 2004, now Pat. No. 7,468,980.

(60) Provisional application No. 60/506,031, filed on Sep. 25, 2003.

(51) Int. Cl.
*H04L 12/38* (2006.01)

(52) U.S. Cl. .............. 370/395.52; 370/395.53; 370/338; 455/572; 455/575.1

(58) Field of Classification Search .................. 370/338, 370/395.52, 395.53; 455/572, 575.1
See application file for complete search history.

(56) References Cited

U.S. PATENT DOCUMENTS

| | | | |
|---|---|---|---|
| 4,751,648 A | 6/1988 | Sears et al. | |
| 5,915,207 A | 6/1999 | Dao et al. | |
| 6,445,777 B1 | 9/2002 | Clark | |
| 6,636,498 B1 | 10/2003 | Leung | |
| 6,876,642 B1 | 4/2005 | Adams et al. | |
| 6,889,032 B2 | 5/2005 | Dao et al. | |
| 7,317,896 B1 | 1/2008 | Saxena et al. | |
| 7,468,980 B1 | 12/2008 | Casto et al. | |
| 2003/0081581 A1 | 5/2003 | Clark et al. | |
| 2003/0174714 A1 | 9/2003 | Manik et al. | |
| 2004/0114610 A1 | 6/2004 | Featherston et al. | |
| 2005/0036622 A1 | 2/2005 | Hay et al. | |

OTHER PUBLICATIONS

R&T, 2001 Research and Technology, NASA Glenn Research Center at Lewis Field, Cleveland, Ohio NASA/TM-2002-211333, copyright 2002, 11 pgs.
NASA, NASA/TM-2002-211140, Application of Mobile Router to Military Communications, Jan. 2002, 14 pgs.
Cisco Systems, Cisco 3200 Series, Mobile Access Router, Product Bulletin No. 1885, Nov. 11, 2002, 26 pgs.
Introduction to Mobile IP (Cisco Systems Oct. 8, 2001), pp. 1-6.
Office action from U.S. Appl. No. 10/804,493 dated Feb. 8, 2007.
Amendment from U.S. Appl. No. 10/804,493 dated Aug. 8, 2007.
Office action from U.S. Appl. No. 10/804,493 dated Feb. 7, 2008.
Amendment from U.S. Appl. No. 10/804,493 dated Aug. 7, 2008.
Notice of Allowance from U.S. Appl. No. 10,804,493 dated Oct. 6, 2008.

*Primary Examiner* — Temica M Beamer
(74) *Attorney, Agent, or Firm* — Calfee, Halter & Griswold LLP

(57) ABSTRACT

A self-contained wireless internet protocol system includes a power supply converter for receiving input power of any type and converting the input power to a system power. A wireless local area network (WLAN) bridge and a wireless wide area network (WWAN) bridge contained within a case receives the system power. A mobile access router also receives the system power and facilitates data communications between the WLAN bridge and the WWAN bridge.

18 Claims, 2 Drawing Sheets

SECURE INTEGRATED MOBILE INTERNET PROTOCOL TRANSIT CASE

This application is a continuation of U.S. patent application. Ser. No. 10/804,493 filed Mar. 18, 2004, now U.S. Pat. No. 7,468,980 which claims the benefit of U.S. Provisional Application No. 60/506,031 filed on Sep. 25, 2003 and both of which are incorporated herein by reference.

TECHNICAL FIELD

The present invention relates generally to network integration systems for wireless networks. More particularly, it relates to incorporation of wireless wide area network components and wireless local area network components into a self-contained, mobile transit case.

BACKGROUND ART

The benefit of wireless local area networks (WLAN) and wireless wide area networks (WWAN) are well documented in the literature. Wireless local area networks, which are based upon the IEEE 802.11 standard, allow for workers and others to disconnect their laptop computers or other internet compatible devices from a server or the like and yet stay connected to the network provided that there is a nearby access point. Such wireless local area networks give users broadband mobility which allows them to access e-mail, calendar functions, corporate databases and the internet while moving around their office building or in proximity to "hot spots," that are provided at airports, conference rooms, and the home. And as wireless local area network devices proliferate, the cost of such devices is becoming more affordable. Such wireless local area networks enhance productivity for sales forces, customer relations management, enterprise resource planning and supply chain management. And such capabilities will have an immediate impact upon the insurance, real estate, health care industries and in the field of public safety and emergency response.

Although local area networks provide improvement in mobility inasmuch as a computer or other internet compatible device does not require to be plugged in, the user is still limited to areas which provide "hot-spot" coverage. Accordingly, the next step up from a local area network is a wide area network which is a geographically distributed collection of local area networks. A router allows for interconnection of local area networks to a wide area network inasmuch as the router may have both a local area internet protocol address and a wide area network internet protocol address. Typically, a router is maintained in a fixed and secure location. Therefore, although users on a local area network may move within the local area network, their movement is still limited to the range of the access point.

This limitation is problematic, especially for emergency responders and military command users. These entities need to be able to rapidly communicate voice, data and video signals with command centers. It will be appreciated that existing network and power infrastructure may be significantly damaged by natural calamities or terrorist events and, as such, not readily available to the emergency responder. Or in military applications, there is likely no existing infrastructure or even if available, it is likely incompatible with the systems desired. Moreover, the existing network may not be secured in a manner needed for such an application.

Therefore, there is a need in the art for emergency responders and others to quickly setup a wireless wide area network capable of supporting at least one wireless local area network. There is a further need for this system to be easily transported and powered by different types of available power supplies.

SUMMARY OF THE INVENTION

It is a first aspect of the present invention to provide a secure integrated mobile internet protocol transit case.

Another object of the present invention, which shall become apparent as the detailed description proceeds, is achieved by a self-contained wireless internet protocol system, comprising a power supply converter for receiving input power of any type and converting said input power to a system power; a wireless local area network (WLAN) bridge receiving said system power; a wireless wide area network (WWAN) bridge receiving said system power; and a mobile access router receiving said system power and facilitating data communications between said WLAN bridge and said WWAN bridge.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
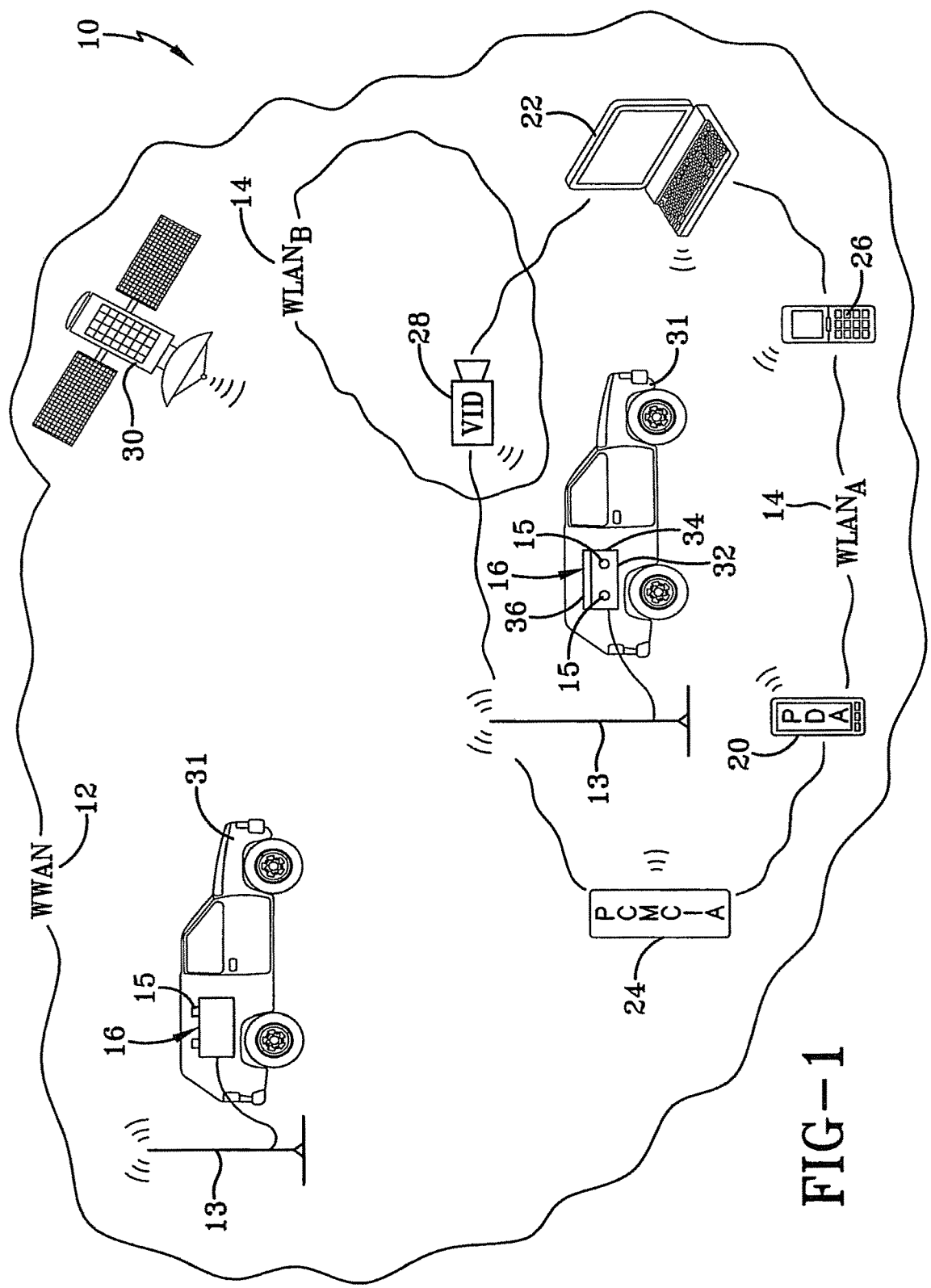
FIG. 1 is a schematic representation of a wireless local area networks as part of a wireless wide area network according to the present invention.

Referring now to the drawings and in particular to FIG. 1, it can be seen that a network system is designated generally by the numeral 10. The system 10 comprises at least a wireless wide area network designated generally by the numeral 12 which employs a wireless area network antenna 13. The wireless wide area network or WWAN 12 is configured to support at least one and preferably a plurality of wireless local area networks (WLAN) designated generally by the numeral 14. Each WLAN 14 provides at least one local area network antenna 15. Those skilled in the art will appreciate that the wireless local area network 14 preferably complies with IEEE 802.11 and all subcomponents of that standard. However, it will be appreciated that the teachings of the present invention are equally applicable to other types of wireless local area networks that may be integrated with one another and compatible with a wide area network.

The WAN antenna 13 is connected to a transit case designated generally by the numeral 16. Details of the transit case will be discussed as the description proceeds but suffice it for now that the case 16 facilitates communications between the WWAN and the WLAN and all associated peripheral devices. These devices are sometimes referred to as "clients," and may include personal digital assistants 20, laptop computers 22 with UTP ethernet connections, PCMCIA cards, internet protocol phones 26, and internet protocol video devices 28. It will be appreciated that any device able to support wireless communications via accepted internet protocol standards may be made part of the local area network 14. Indeed, a satellite communications link 30 may be employed to communicate with either the wireless wide area network 12 or even the local area network 14. Of course, the satellite 30 may communicate with other hard-wired points or internet based devices. Indeed, it will be appreciated that the WWAN 12 and the WLAN described herein are effectively nodes and that it is envisioned at any type of wireless node such as a network bridge or network access point may be a part of the system 10 and included within the case 16. Accordingly, it is envisioned that a satellite communication device may be incorporated internally or externally within the case 16.

The transit case 16 may be carried by a mobile vehicle 31. In the preferred embodiment, the transit case 16 is configured for military and emergency response applications and allows for a communications interface among and between both the WLAN and the WWAN. The mobile vehicle 31 is preferably a vehicle capable of traversing difficult terrains that may be encountered by armed forces. In the alternative, the vehicle may be a boat, a plane, a tethered or untethered aerostat or other readily moveable device. Ideally, the vehicle 31 is relatively stationary during use of the network so as to enhance communications between the various networks, but it will be appreciated that the vehicle 31 may be moveable while still maintaining the operative connections for both networks.

Figure 2:
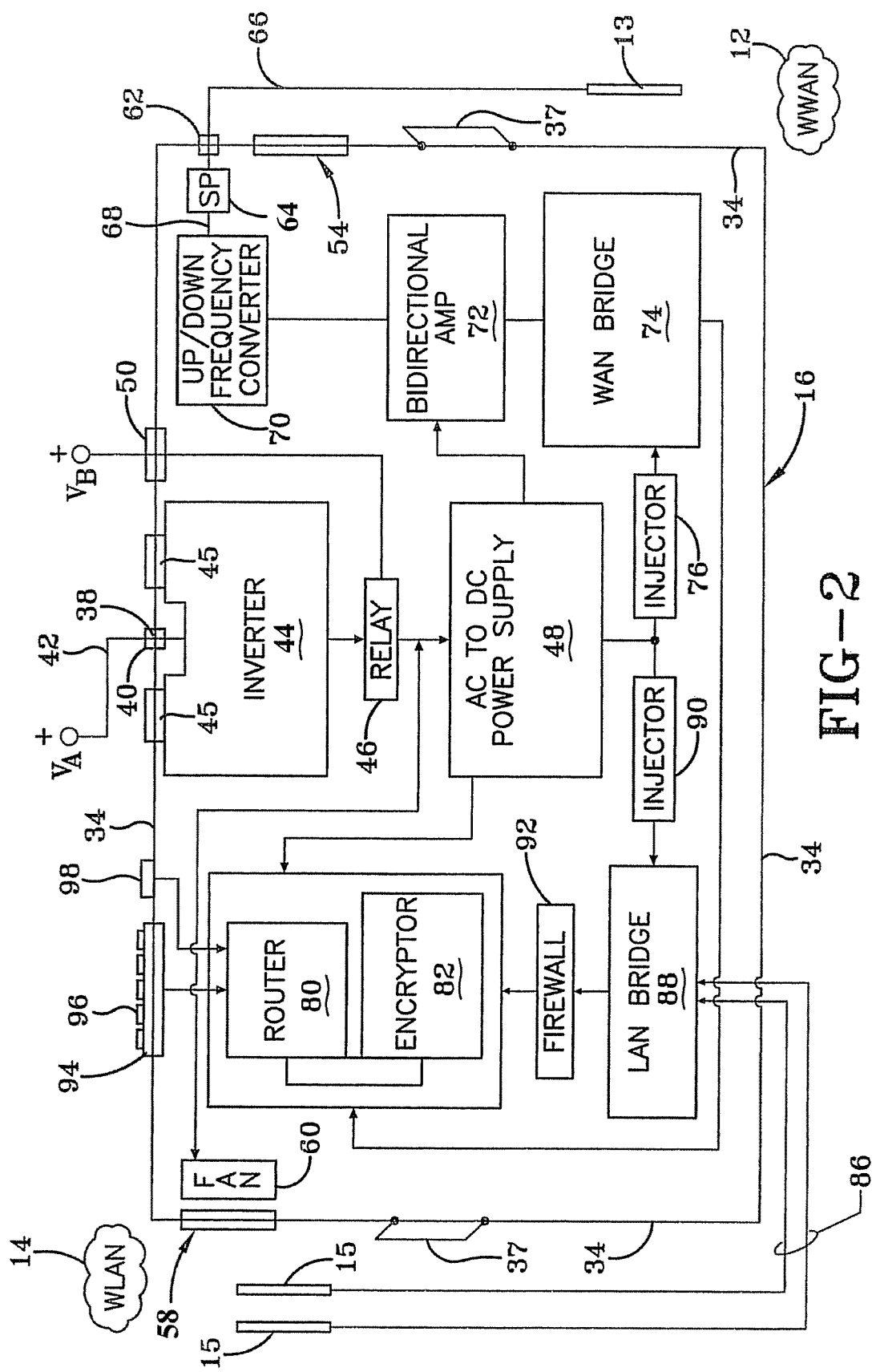
FIG. 2 is a schematic representation of a transit case embodying the concept of the present invention.

As best seen in FIG. 2, the transit case 16 is preferably a self-contained housing which incorporates a bottom 32, an appropriate number of side panels 34 extending from the bottom 32, and a detachable top 36 that is mateable around the outer periphery of the side panels 34. Extending from the side panels 34 or other areas of the housing are handles 37. These handles allow for transfer of the case 16 as needed. It will further be appreciated that the case 16 is likely secured with bolts and/or appropriate brackets to the vehicle so as to prevent damage to the case during movement of the vehicle. Although any material could be used for the case 16 such as steel, fiberglass or polycarbonate, it is believed that anodized aluminum provides the needed strength, durability and light weight needed for the case's likely environment. Furthermore, a, gasket or gaskets may be interposed between the top 36 and the side panels 34 to likely qualify the case as a NEMA 4 rated enclosure.

Electrical power is provided to components within the case 16 and may be in any various number of forms. It is envisioned that the primary source of input power in emergency response situations will be 12V DC which is supplied from the vehicle's electrical battery or other external stand alone battery, fuel cell or generator carried by the vehicle. This power is designated as $V_A^+$ in FIG. 2. In the alternative, it will be appreciated that 110V AC input power provided by a standard residential power source, which is designated as $V_B^+$ in FIG. 2, may also be received by components within the transit case. Of course, the transit case can be adapted to receive other types of input power voltages and frequencies.

One of the side panels 34 provides a power cable opening 38 therethrough. A cord grip 40 may be installed within the cable opening 38 wherein the grip 40 provides strain relief for receiving a power cable 42 from the battery carried by the mobile vehicle 31. The power cable 42 is connected to a power inverter 44 which transforms and converts the received 12V DC, or the appropriate voltage input by the vehicle 31, to an internal voltage of 110V AC. The power inverter 44 provides at least one switched outlet 45 which may be utilized for components within the case 16 or for a component outside of the case. In any event, the power inverter 44 generates the internal 110V AC that is received by a relay switch 46. Preferably, the side panel 34 provides an access port 50 which allows for direct receipt of an external 110V AC from a standard residential outlet or from a generator. If such a preferred power source $V_B^+$ is detected by the relay switch 46, then the power generated by the inverter 44 is cut off. However, if no other AC source is sensed by the relay switch 46 then the power generated by the inverter 44 is transferred to the AC to DC power supply 48 which, in turn, generates a system power for distribution to components within the case. The system power refers to the various voltage values distributed to other components within the case 16. Based on the preferred embodiment, the power supply provides 3.3V DC, 12V DC, 15V DC, 24V DC and up to 48V DC. Of course, other voltage values could be generated as necessitated by the components contained within the case.

The case, and in particular one of the side panels 34, provides a fan intake port 54 while one of the opposed or adjacent panels provides a fan exhaust port 58. A fan 60 is electrically connected to the relay switch 46 and generates an air flow from the intake port 54 to the filtered exhaust port 58 for the purpose of cooling the internal components within the case so as to prevent their overheating. It will be appreciated that the intake and exhaust ports 54 and 58 may be positioned anywhere in the side panels, or in the bottom or top of the case so as to allow for an appropriate amount of airflow therethrough. The fan 60 and its respective intake port 54 are IP 55 rated. In the preferred construction the fan 60 pulls 29 CFM through the case. It will further be appreciated that the components within the case may have their own internal fans to provide the desired thermal management of the case.

One of the side panels 34 provides an antenna cable opening 62 which is associated with a surge protector 64. The opening 62 receives a coaxial transmission cable 66 that is connected at one end to the antenna 13. The antenna 13 facilitates operation of the wireless wide area network and provides coverage of up to twenty five (25) miles depending upon the height of the antenna and it's frequency of operation. The length of the cable 62 is determined by the height of the mast to which it is attached. Atop the mast is a sectorized antenna ensemble that allows for 360" propagation. It will be appreciated by those skilled in the art that the WWAN is significantly more far reaching than WLAN. If the transit case is utilized in a military application and Federal Communication Commission regulations can be ignored, a range of up to twenty-five (25) miles can be obtained. However, in a regulated environment, the range of the network will depend upon the height of the antenna's mast. For example, a three hundred foot mast height could extend the WWAN to twelve to fifteen miles. Another factor in determining the range of the wide area network is the frequencies utilized by the system. With an optional up/down frequency converter 70 that receives a WWAN signal 68 carried by the cable 66, the networks can switch between a 900 MHz range to a 2400-2500 MHz range to a 5700-5800 MHz range. This adds versatility and stealth to the overall system. In other words, the system may avoid radio frequency jamming attacks or allude avoid a "noisy" RF environment simply by changing the frequency range.

The WWAN signal 68, after processing by the frequency converter 70, is directed to a bidirectional amplifier 72 for the purpose of boosting the signal 68 as needed. It will be appreciated that the amplifier 72 is powered by the AC to DC power supply 48 and in particular receives 24V DC therefrom. And the power supply 48 generates 12V DC that is supplied to a power-over-ethernet injector 76 which in turn powers a WAN bridge which receives the signal 68 from the amplifier 72. In other words, the WAN signal 68 enters the WAN bridge 74 from the antenna 13, propagates through the injector 76 and on to a mobile router 80.

In the preferred embodiment, the router 80 is a CiscO™ 3200 Series Mobile Access Router. The router 80 provides data, voice and video communications, seamless mobility and interoperability across multiple wireless networks. The router 80 is capable of forwarding data at multi-gigabytes per second speeds which allow for vast packets of data to be implemented in IP routers. Such a device allows for the routing of large data, voice and video packets to the appropriate IP—WAN or LAN—networks while many elements are in motion. The router 80 may be connected to an encryptor 82 for the purpose of encrypting and/or decrypting the network signals. The router 80 receives 24V to 48V DC from the power supply 48. The encryptor 82 receives the appropriate operating voltage from the supply 48 and/or the router.

The wireless local area network is generally facilitated by at least one and preferably two rugged antennas 15 which are mounted on or within the case 16. Other connections to the case may be utilized such as a dipole antenna(s) attached to a fitting or fittings on the case. Such an antenna may be mounted on a fender of a vehicle that is transporting the case. The wireless LAN has an operating radius of up to 2000 feet from the case. It is believed that use of multiple antennas 15 provide an enhanced continuity of coverage and overcomes any omissions by the antenna's field radiation pattern. In any event, a LAN signal 86 is transmitted and received by the antennas 15. The LAN signal 86 is processed by a LAN bridge 88 which converts the wireless signal to a discrete signal. The LAN bridge is powered via a power-over-ethernet injector 90. The injector 90 is powered by 12V DC received from the power supply 48. If desired, a firewall 92 may be interposed between the injector 90 and the router 80 for the purpose of disallowing any unauthorized entry into the network. For example, if a packet source address is not approved by the router 80 it is not allowed to pass through the firewall. It will also be appreciated that encryption may be employed between a firewall and client as deemed appropriate. The preferred firewall 92 carried by the case is a CISCO PIX™ security appliance which provides robust, enterprise, class integrated networks security service including stateful inspection firewalling, protocol and application inspection, virtual private networking, in-line intrusion projection and various other features. The firewall 92 is powered by 3.3V DC generated by the power supply 48.

The bridges 88 and 74 receive their respective area network signals and provide seamless connectivity from wireless to wired networks and vice versa. It will be appreciated that the bridges are designed to connect two or more networks and facilitate point-to-point and point-to-multipoint configurations over the range provided by the respective antennas. Accordingly, the bridges allow multiple sites to share a single, high-speed connection to the internet or other dedicated network system. For functional flexibility, the wireless bridges may be configured as access points themselves.

One of the side wall panels 34 may be provided with a connector opening 94 which includes at least one connector port 96 that is connected to the router 80. Accordingly, system maintenance may be performed from a laptop computer or the like via the ports 96 to the router 80. This allows for assigning of IP addresses and other related designations. Such a connection would also allow a technician to monitor the operational performance of the router, the bridges, the power supply, the inverter and any other components contained within the case 16. The case 16 may also provide a display 98 that is operatively connected to the router 80 and other components within the case for the purpose of showing the operational status or programming data associated therewith.

It will further be appreciated that the power supply 48 adjusts the input voltage $V_A^+$ or the 110V AC source $(V_B^+)$ provided by either the inverter 44 or direct input, and provides system power to the router 80 and associated encryptor 82 and also to the injectors 76 and 90. Additionally, the power supply 48 supplies the necessary system power to the bridges 88 and 74 and also to the bidirectional amplifier 72.

The system 10 is expandable in view of the various wired and wireless systems that exist. The system 10 may be integrated with the satellite 30, commercial telephony, GPRS, and other means. Accordingly, in an emergency environment there is no limit as to where a "headquarters" operation center can be located. An area of system "operations" can be around the globe from its tactical leadership. Thus, if the field operation is in need of material housed in a distantly remote database, the connection can be made. If the remote "op center" is in need of "field data" to make a decision, the client of a mobile WLAN can gather such information, transmit it to the apparatus' systems WLAN, then to the WWAN, and then to an interconnect satellite or otherwise back to the operation center. It will be appreciated that the router and related hardware and software associated therewith is adaptable to different wireless telecommunication modes. These various modes on associated data rates are listed in the table below.

| VOICE | DATA | RATE(ACTUAL) |
|---|---|---|
| GSM | GPRS | 30-80 Kbps |
| CDMA | RTT1X | 40-160 Kbps |
| GSM | EDGE | 100-150 Kbps |
| W-CDMA | EVDO | 256 Kbps |

GSM, which stands for global system for mobile communications, is a communication system which provides for international roaming capability. As such, it provides consumers with seamless and same standardized number contactability in most every country. Moreover, GSM satellite roaming has extended service access to areas where terrestrial coverage is unavailable. GSM is utilized by approximately 90% of the world and as such the features are desirable for incorporation into the present invention. GSM voice capabilities are compatible with GPRS, which stands for general packet radio service, and which allows information to be sent and received across the GSM telephone network. GSM may also support the EDGE standard or enhanced data rates for global evolution, which also deliveries broadband-like data speeds to mobile devices. This system allows consumers to connect to the internet and send and receive data, including digital images, web pages and photographs, supposedly three times faster than the GPRS network. Other voice data transfer standards are CDMA and W-CDMA wherein the W indicates a wideband service. It is envisioned that the disclosed device is capable of supporting such standards and communications in the internet protocol traffic. Indeed, the W-CDMA supports the EVDO which stands for evolution data only. EVDO supposedly supplies wireless data actions that are ten times as fast as a regular modem. In any event, it will be appreciated that the transit case and the associated router is adaptable to the evolving data communication standards for wired and more specifically wireless technologies as they evolve.

Another feature that may be incorporated into the transit case and associated hardware components contained therein are anti-hacking tools. Whereas the Up/Down frequency converter allows the device to avoid an invader, the anti-hacking tool will initiate a large number of fake internet protocol addresses such that any hackers are dissuaded inasmuch as it is to difficult to discern which IP address is genuine and which is not. Therefore, it will be appreciated that the router and associated components are programmable or modifiable with hardware to enhance the security of the transit case and associated mobile internet protocol.

Based upon the foregoing, the advantages of the present invention are readily obvious. In particular, by employing a single transit case that provides both a local area network bridge and a wide area network bridge in conjunction with a router, connections to the internet may be quickly established. Indeed, the system 10 allows for establishment of a network in emergency response situations in areas where internet or network access is not easily facilitated. The transit case 16 is advantageous in that it provides the appropriate inverter and power supply configuration to receive any number of different types of power voltages and operating frequencies and converts it to the necessary power required to operate components within the case. In particular, the power supply adjusts the input voltage to an appropriate voltage value for driving the bridges and power over ethernet injectors. Additionally, the power supply is utilized to power the router and the bidirectional amplifier. Although the inverter supplies power to the fan 60 via the relay switch it will also be appreciated that the power supply 48 can be configured to do the same. By providing such a compact configuration wherein the bridge components and router components are integrated with one another and wherein antennas are easily configured to attach to the transit case, a truly mobile internet system is provided. Moreover, the system is capable of supporting any number of local area networks and wide area networks based only upon the limitations of the router 80. Therefore, it is believed that all of the objects of the invention are carried out by the transit case and that a definite improvement in the art has been realized.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A self-contained wireless internet protocol system, comprising:
a power supply receiving input power of any type and converting said input power to a system power;
a wireless local area network (WLAN) bridge receiving said system power;
a wireless wide area network (WWAN) bridge receiving said system power;
a mobile access router receiving said system power and facilitating data communications between said WLAN bridge and said WWAN bridge; and
a case which carries said power supply, said WLAN bridge, and WWAN bridge, and said mobile access router; and
an inverter carried in said case, said inverter receiving and transforming an external mobile voltage value into an internal voltage value, wherein said internal voltage value is received by said power supply for conversion to said system power.

2. The system according to claim 1, further comprising:
a firewall coupled to said mobile access router and to said WLAN bridge to monitor communications therebetween.

3. The system according to claim 1, further comprising:
a relay switch electrically connected between said inverter and said power supply, said relay switch receiving and transmitting a preferred external voltage value instead of said external mobile voltage value to said power supply.

4. The system according to claim 1, further comprising:
a WAN injector electrically connected between said WAN bridge and said power supply; and a LAN injector electrically interposed between said LAN bridge and said power supply;
said injectors receiving said system power.

5. The system according to claim 1, further comprising:
a wide area network antenna extending from said case and transmitting and receiving a wide area network signal; and
a bidirectional amplifier contained within said case and receiving said system power, said bidirectional amplifier receiving and transmitting said WAN signal between said WAN bridge and said WAN antenna.

6. The system according to claim 5, further comprising:
an up/down converter electrically connected between said WAN antenna and said bidirectional amplifier, said up/down converter adjusting the frequency of said WAN signal.

7. The system according to claim 1, further comprising:
at least one local area network antenna extending from said case, and transmitting and receiving a local area network signal, wherein said LAN bridge is connected to said local area network antenna.

8. The system according to claim 1, further comprising:
a fan carried within said case, said case having an intake port and an exhaust port, wherein said fan generates an air flow through said ports.

9. The system according to claim 8, wherein said fan is electrically connected to a relay switch.

10. The system according to claim 1, wherein said case has at least one connector port electrically connected to said router.

11. The system according to claim 1, further comprising:
an encrypter associated with said mobile access router to encrypt communications associated with said WWAN bridge and WLAN bridge.

12. The system according to claim 1, wherein said power is generated at least at two different values and distributed to said bridges and said router.

13. The system according to claim 12, wherein said system power is distributed to other components at an appropriate level.

14. A self-contained internet protocol system, comprising:
a power supply receiving input power and converting said input power to a system power;
a local area network (LAN) bridge receiving said system power and having a first single input;
a wide area network (WAN) bridge receiving said system power and having a second signal input;
an access router receiving said system power and facilitating data communications between said local area network bridge and said wide area network bridge;
a router connection port configured to connect external devices to the system; and
a router display configured to show the operational status of the system.

15. The system of claim 14 wherein the input power comprises a DC power input type or an AC power input type.

16. The system of claim 14 wherein the input power comprises a plurality of DC power input types.

17. The system of claim 14 wherein the input power comprises a plurality of DC power input types or a plurality of AC power input types.

18. The system of claim 14 further comprising a plurality of power input ports, each power input port configured to accept at least one type of input power.

* * * * *